United States Patent
McClain

(12)
(10) Patent No.: US 6,322,632 B1
(45) Date of Patent: Nov. 27, 2001

(54) METHOD FOR PRODUCING OXIDIZED STARCH

(75) Inventor: James A. McClain, Davenport, IA (US)

(73) Assignee: Archer-Daniels-Midland Corporation, Decatur, IL (US)

( * ) Notice: Subject to any disclaimer, the term of this patent is extended or adjusted under 35 U.S.C. 154(b) by 0 days.

(21) Appl. No.: 09/506,746

(22) Filed: Feb. 18, 2000

(51) Int. Cl.$^7$ .................................................. C08B 31/18
(52) U.S. Cl. .............................................. 127/71; 536/105
(58) Field of Search ................................ 127/71; 536/105

(56) References Cited

U.S. PATENT DOCUMENTS

| | | | |
|---|---|---|---|
| 4,048,434 | 9/1977 | Speakman | 536/105 |
| 4,146,515 | 3/1979 | Buikema et al. | 260/9 |
| 4,579,944 | 4/1986 | Harvey et al. | 536/102 |
| 4,841,040 | 6/1989 | Just et al. | 536/105 |
| 5,833,755 | * 11/1998 | Schlom et al. | 127/32 |
| 6,008,345 | * 12/1999 | Dannoue et al. | 536/124 |

FOREIGN PATENT DOCUMENTS

| | | |
|---|---|---|
| 19746805 C1 | 4/1999 | (DE) . |
| WO 97/35890 | 10/1997 | (WO) . |
| WO 99/23240 | 5/1999 | (WO) . |

OTHER PUBLICATIONS

Kantouch, F. and Tawfik, S., "Gelantinization of Hypochlorite Oxidized Maize Starch in Aqueous Solutions," *Starch/Stärke 50:*114–119 (1998) No Month Provided.

Patel, K.F. et al., "Kinetics and Mechanims of Oxidation of Starch with Sodium Hypochlorite," *J. Applied Polymer Sci. 18:*389–399 (1974) No Month Provided.

Radley, J.A. in *Starch Production Technology*, Applied Science Publishers Ltd., London, United Kingdom, p. 464 (1976) No Month Provided.

Wurzburg, O.B. in *Modified Starches: Properties and Uses*, CRC Press, Inc., Boca Raton, Fla., pp. 23–29, 226 (1986) No Month Provided.

Dialog File 351, Derwent WPI, Accession No. 99/206082/ 19991, English language abstract for DE 19746805 C1. (1991) No Month Provided.

* cited by examiner

*Primary Examiner*—David Brunsman
(74) *Attorney, Agent, or Firm*—Sterne, Kessler, Goldstein & Fox PLLC

(57) ABSTRACT

The present invention fulfills, in an efficient, cost effective manner, the need for a starch which has a reduced tendency to form amylose crystals after cooking by providing a method using high levels of caustic materials during a reaction of oxidant with uncooked starch granules.

7 Claims, No Drawings

METHOD FOR PRODUCING OXIDIZED STARCH

FIELD OF THE INVENTION

This invention relates to the production of chemical derivatives of starch. More particularly, this invention relates to processes for preparation of derivatized starch pastes which are useful in papermaking, textile size and so forth.

BACKGROUND OF THE INVENTION

Starch is a naturally occurring polymer made up of simple sugars and is obtained by processing plant materials. The plant materials from which starch is derived include, but are not limited to, corn, wheat, potato and tapioca. Of these plant materials, corn is one of the most widely used sources for starch in North America.

Starch is used in a wide number of applications, which include both industrial and private settings. These uses include food products, papermaking, corrugated boxes, glue, baby powder and textiles. In some of these applications, a dry starch is used, while in others, a cooked starch is employed.

Starch has a number of unique properties that make it suitable for a variety of applications. One of starch's many properties is its ability to form a viscous fluid upon application of energy and water. The viscous fluid can be applied to substrates such as paper and textiles, whereby it increases the stiffness of the material.

While starch has a number of unique properties, it has some properties that can limit its usefulness in certain applications. For example, cooked starch has a tendency to congeal and fall out of solution if the paste hold temperature drops below a certain level. This tendency to drop out of solution is called "retrogradation." Once a starch retrogrades, it is difficult to get the cooked starch back into solution.

Another property that limits the use of cooked starch in certain applications is the tendency to form amylose crystals under certain pH and temperature conditions. Amylose is a component of starch that is essentially a straight chain of simple sugars. The other major type of starch is amylopectin, which is a branched starch molecule. Amylose crystals are undesirable because, among other reasons, of their limited ability to bind to substrates. A cooked starch paste has a greater tendency to form amylose crystals under low pH conditions (7.5 pH or less) and at temperatures between 153 and 193° F. (Wurzburg, O.B.,*Modified Starches: Properties and Uses*, CRC Press, Inc., Boca Raton, Florida, 1986, p. 226).

To expand the use of cooked starch applications, manufacturers have chemically altered, or modified, the uncooked starch molecule. In the case of retrogradation or amylose formation, the uncooked starch has been modified by attaching "bulky" side chemical groups to the starch molecule. The bulky side groups keep adjacent starch molecules from aligning in close proximity and thus hinder the tendency to coalesce after cooking. Similarly, the bulky side groups also reduce the tendency to form amylose crystals.

Typically, the starch modification is accomplished by treating an aqueous uncooked starch granule suspension with a reagent. Depending on the product being formed, the modification can be accomplished by treating with reagents such as, but not limited to, ethylene oxide, hydrochloric acid, hydrogen peroxide and sodium hypochlorite.

One common technique used by industry to add carboxyl groups onto a starch molecule (or chain) is by reacting starch with an oxidant. These oxidants include, but are not limited to, sodium hypochlorite and calcium hypochlorite. It is noted that the oxidation reaction causes additional changes in the starch molecule such as causing the cooked starch paste to become less viscous because it "clips" the length of the chain. When either sodium or calcium hypochlorite is used as an oxidant, the reaction is run under alkaline conditions, which favors the production of the bulkier carboxylic acid side groups over ketone side groups (Wurzburg, pps. 23–29). The alkaline conditions are obtained by adding sodium hydroxide solution. At the end of the reaction, the excess alkalinity is neutralized with acid.

Other methods of oxidizing starches include reacting starch with: ozone in an aqueous medium (PCT Patent Application WO935890); a reagent producing oxoammonium ion, in particular 2,2,6,6-tetramethylpiperidin-1-oxyl, in the presence of an oxidizing agent or oxidizing enzyme such as laccase (PCT Patent Application WO9923240); and halogen or hypohalite in the presence of di-tertiary alkyl nitroxyl and an alkali metal or alkaline earth metal bromide as catalysts (German Patent No. 19746805). Chemically-mechanically (C-M) gelatinized starch may also be derivatized by reaction with hypochlorite at an alkaline pH. C-M gelatinized starch is starch that has been heated and subject to a shearing force to produce an essentially dispersed and homogeneous starch paste (U.S. Pa. No. 4,579,944). Other procedures employ a gelatinization inhibitor such as sodium chloride or sodium sulfate, and react the starch with the derivatizing agent at an alkaline pH for a period of time up to 20 hours.

As mentioned earlier when discussing properties that limit the use of cooked starch in certain applications, amylose crystals have a greater tendency to form at temperatures between 153 and 193° F. and at pH's less than 7.5. Based on these phenomena, others have focused their work on preventing amylose formation in cooked starch through the means of controlling temperature and/or pH.

The most straightforward way to ensure that the pH in the cooked starch is in the appropriate range is to control it using standard industrial techniques. For example, the pH control would likely be a pH probe (or multiple pH probes) in the cooked starch tanks which control the addition of either an acid or a caustic substance. In this case, if the pH was too low, an alkaline sodium hydroxide solution could be added to raise the pH.

While the pH control method has some advantages, it has a number of disadvantages. One disadvantage is the control of the pH is dependent on the reading of the pH sensors in the cooked starch tanks. If the reading from the sensor is in error, the resultant addition of acid or caustic will be in error. For example, it is well known that the readings from a pH probe will drift with time. This drift is caused by a number of things, including the physical deterioration with time of the probe, build-up of material on the probe, short circuiting of the wires leading from the pH sensor to the controller, etc. Because of the critical nature of the pH sensors in relation to preventing the formation of amylose crystals, the probes need a relatively high degree of maintenance to ensure they are working properly. This high degree of maintenance adds to the cost of producing the material, thereby raising the cost of the product.

Another way to reduce the tendency to form amylose crystals is by heating and maintaining the temperature of the cooked starch above 193° F. (89° C.). Normally, cooked starch is kept at an elevated temperature until it is used. However, the temperature required for prevention of amylose crystals is higher than typically required for the cooked starch paste. Additionally, the higher temperature will increase the rate of evaporation for the water, which will increase the solids content of the cooked starch slurry. Thus, using this technique to reduce amylose formation will increase the energy costs by having to heat the slurry to a higher temperature and has the possibility of changing the cooked starch solids concentration.

Alternatively, to reduce the tendency to form amylose crystals, there exists the option of keeping the temperature of the starch paste at less than 153° F. However, in certain applications this is not a preferred option because the lower temperature paste does not penetrate into the paper which can cause a lower strength in the plane of the paper.

It is apparent from the above that there exists a need in the art for a method which produces a cooked starch which has a reduced tendency to form amylose crystals but at the same time do it in an efficient cost effective manner. It is the purpose of this invention to fulfill this need and other needs in the art in a manner more apparent to the skilled artisan once given the following disclosure.

SUMMARY OF THE INVENTION

The present invention fulfills the need for a starch which has a reduced tendency to form amylose crystals after cooking. The present invention provides an efficient, cost effective method of oxidizing starch using high levels of caustic materials during a reaction of oxidant with uncooked starch granules.

The starch is reacted with a mixture containing an oxidizing reagent and a high concentration of caustic material. The starch of the present invention is reacted in the form of an aqueous starch slurry. The starch should not be in a gelatinous form. Further, the oxidizing agent-caustic material mixture with which the aqueous starch slurry is reacted, does not contain a gelatinization inhibitor.

In a preferred embodiment of the present invention, sodium hypochlorite is used preferably with high concentrations of sodium hydroxide for oxidizing starch. The hydroxide concentration of the hypochlorite is between 4.5 and 10%, with the preferred concentration being greater than 5% and less than 10%. Most preferred is a hydroxide concentration of approximately 9%. The amount of hypochlorite used in the oxidation reaction of the uncooked starch granules will depend on the properties desired in the cooked starch paste.

Further, an improved cooked starch product having a more consistent viscosity than starch produced by other methods results from using the method of the present invention.

DETAILED DESCRIPTION OF THE INVENTION

All of the starch reactions discussed herein are performed on uncooked starch granules because of the ease in handling the starch in a manufacturing setting. However, it is the resultant properties of cooked starch from these granules that is desired. The resulting cooked starch has a markedly reduced tendency to form amylose crystals.

The term percent (%) refers to weight percent of solid in 100 ml of liquid. For example, 9 grams of sodium hydroxide in 100 ml of water yields a 9% sodium hydroxide aqueous solution.

The term starch refers to polymeric compounds composed of simple sugars. These compounds are derivatives of plant material and may be isolated from sources that include, but are not limited to, corn, wheat, potato, tapioca and cassava.

The term oxidant refers to a chemical that may be, but is not limited to, sodium hypochlorite and calcium hypochlorite.

The term caustic refers to a chemical that may be, but is not limited to, sodium hydroxide, potassium hydroxide and sodium carbonate.

While manufacturers can control the starch reaction pH during the oxidation of uncooked starch, some manufacturers do not control the pH of the starch slurry and thus let the pH wander over a relatively wide range. There are various reasons not to control pH during the oxidation reaction of the starch related to the cost involved in producing the product. It is this later category of manufacture that the present invention will have the most utility. However, even those that control the pH will also benefit from this invention. The use of the higher caustic in the hypochlorite has eliminated the necessity for pH control during the starch oxidation reaction, and acceptable results are obtained using high caustic hypochlorite without any pH control on the system.

The typical method for forming oxidized starch is found in Buikema et al., U.S. Pat. No. 4,146,515, Mar. 27, 1979, "Making a Lightly Oxidized Starch Additive by Adding a Cationic Polymer to Starch Slurry Prior to Heating the Slurry" (2:44–58), the contents of which are incorporated herein by reference. As described in that patent, hypochlorite solution is added to an aqueous suspension of starch, and the pH of the solution is controlled to between 8 and 10 throughout the reaction by addition of alkali. Typical concentration of caustic material used with the oxidizing agent is 4.5% or below, with a value of 4.2% addition being reported in the literature (Radley, J. A., *Starch Production Technology*, Applied Science Publisher Ltd., 1976, p. 464).

In a preferred embodiment of the present invention, sodium hypochlorite is used preferably with high concentrations of sodium hydroxide. As mentioned above, the typical level of sodium hydroxide used in the hypochlorite solution for oxidation of starch by previous methods is 4.5% or below. However, in the present invention the sodium hydroxide concentration of the hypochlorite is between 5% and 10%, with the preferred concentration being approximately 9%. While the literature reports that the conditions of reaction should be "somewhat alkaline" (Wurzburg, p. 25), the present invention envisions the reaction run in conditions that are strongly alkaline.

While the discussion presented herein focuses on the use of sodium hypochlorite as the oxidizing agent and sodium hydroxide as the caustic agent, those skilled in the art will recognize that comparable results will be achieved when substituting other oxidizing agents, caustic agents, and starch sources, including those listed above.

The amount of hypochlorite used in the oxidation reaction of the uncooked starch granules will depend on the properties desired in the cooked starch paste. For a starch with more carboxyl groups or a lower viscosity, a higher ratio of oxidant to starch is used.

The high caustic level used in practice of the present invention results in the pH of the starch after cooking being higher than found in a typical reaction. This higher pH after cooking reduces the tendency of the cooked starch to form amylose crystals.

An additional unexpected result is that the viscosity of the cooked starch made with the method of the invention shows less variation than starch made with normal caustic levels. Oxidized starch prepared using higher caustic levels show up to 20% less viscosity variation than derivatized starch made using the caustic levels of the prior art.

As one skilled in the art will recognize, the present invention provides an efficient, cost effective method of producing oxidized starch having a reduced tendency to form amylose crystals after cooking. Cost savings and ease of use improvements over prior methods are realized from removing the necessity of controlling the pH of the oxidation reaction, without the need to process the starch to a gelatinized form or the use of additional chemicals such as gelatinization inhibitors. Further, an improved cooked starch product having a more consistent viscosity than starch produced by other methods results from using the method of the present invention.

The following example illustrates the present invention and the advantages thereof.

EXAMPLE

A 40% solids starch slurry was reacted with 2.5% $Cl_2$ at 110° F. for 4 hours. The chlorine used in the oxidation reaction was provided by a solution of sodium hypochlorite containing approximately 9% free caustic by volume (9 g NaOH per 100 ml of the solution) and approximately 16% $Cl_2$ by volume. Two important starch properties that are manipulated by employing a higher caustic level are the viscosity and the pH of the cooked starch paste. The resulting viscosity of the cooked starch paste (15% solids, as measured by the Rapid Visco Analyzer) was 800 cps and the pH was 7.5.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method for producing oxidized starch comprising reacting an uncooked aqueous starch slurry with a mixture comprising an oxidant and caustic material, said mixture having a hydroxide concentration greater than 5%, wherein the oxidized starch has a reduced tendency to form amylose crystals after cooking.

2. The method of claim 1 wherein said hydroxide concentration is less than 10%.

3. The method of claim 2 wherein said oxidant is sodium hypochlorite.

4. The method of claim 2 wherein said oxidant is calcium hypochlorite.

5. The method of claim 2 wherein said caustic material is sodium hydroxide.

6. The method of claim 2 wherein said caustic material is potassium hydroxide.

7. The method of claim 2 wherein said hydroxide concentration is about 9%.

* * * * *